C. CONTAL.
SUSPENSION DEVICE FOR VEHICLES.
APPLICATION FILED JULY 2, 1914.
1,140,955.
Patented May 25, 1915.
2 SHEETS—SHEET 1.
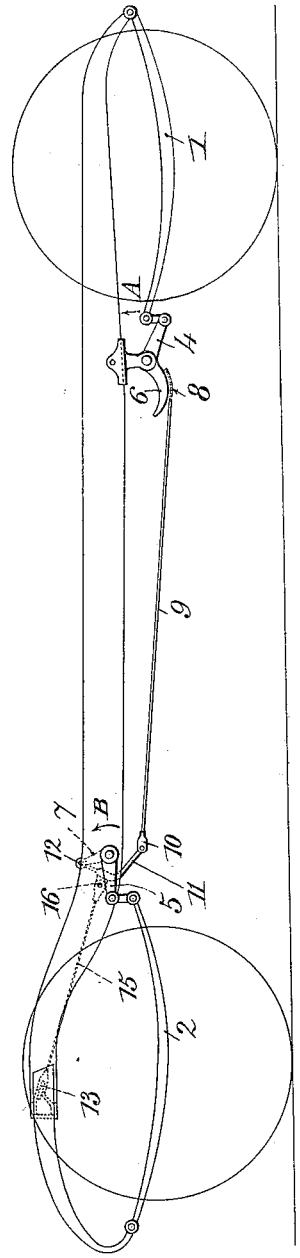
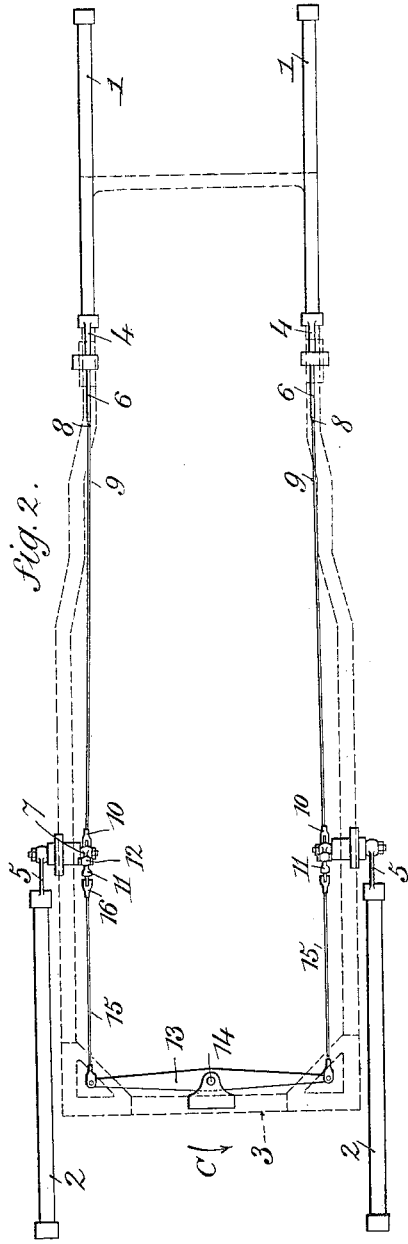
Witnesses
Inventor
Camille Contal
by Wilkinson, Guieta
&Mackaye
his Attorneys C. CONTAL.
SUSPENSION DEVICE FOR VEHICLES.
APPLICATION FILED JULY 2, 1914.
1,140,955.
Patented May 25, 1915.
2 SHEETS—SHEET 2.
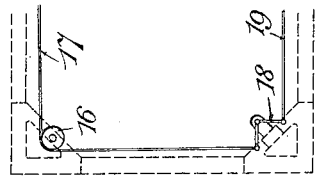
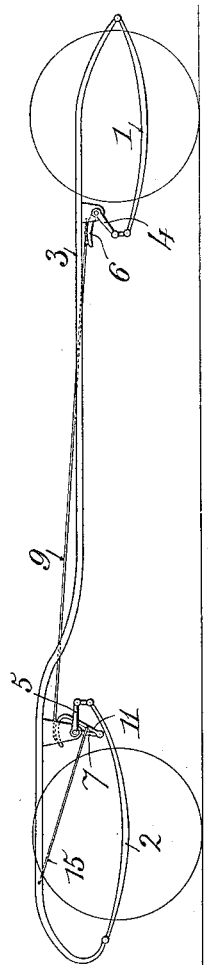
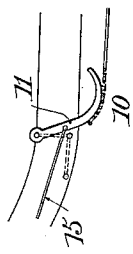

UNITED STATES PATENT OFFICE.

CAMILLE CONTAL, OF ST.-CLOUD, FRANCE.

SUSPENSION DEVICE FOR VEHICLES.

1,140,955. Specification of Letters Patent. Patented May 25, 1915.

Application filed July 2, 1914. Serial No. 848,654.

*To all whom it may concern:*

Be it known that I, CAMILLE CONTAL, a citizen of the Republic of France, residing at 6 Avenue Magenta, St.-Cloud, Seine Department, in the Republic of France, engineer, have invented certain new and useful Improvements in Suspension Devices for Vehicles, of which the following is a specification.

The subject-matter of this invention is a suspension device applicable to all kinds of vehicles and more particularly to motorcars.

Such device is of the kind in which the chassis rests on front and rear springs through the medium of suspension levers which are so connected mechanically with one another that on the sudden displacement of a wheel passing over an obstacle, the supplementary load put on the corresponding spring is distributed on all the springs at the same time.

In order that such a device shall be efficient, the strain transmitted to the four angles of the chassis must be equally divided; under such condition only will the chassis remain parallel to itself, the amount of its vertical displacement being very little, and will not be liable to the warping which fatigues the chassis, the coach-work and also the travelers. Such equal distribution of the strain requires that the mechanism connecting the suspension levers shall not offer any material passive resistance, either by reason of the friction or by reason of the inertia. Furthermore, in order that the device shall be easily applicable to the generality of vehicles, it is indispensable that it shall not be cumbersome and shall not comprise, in particular, any members traversing the space situated under the main portion of the chassis.

For the purpose of satisfying such multiple conditions, this invention consists in connecting on each side of the car the front suspension lever with the rear suspension lever by a link or other pulling member and what is called a compensation lever jointed to one another, the link being jointed to one of the suspension levers and the compensating lever jointed to the other suspension lever, and furthermore in connecting together the compensating levers located at the left and right of the car in such a manner that the similar points chosen on such levers between their jointed parts with the suspension arm and with the links or at the outside of the said jointed parts shall always be caused to move to the same amount in inverse directions.

In order to avoid any obstruction, the links and the levers are located in proximity to the girders of the chassis and the device connecting the levers is preferably so fitted as to follow approximately the contour of the rear part of the chassis; such connecting device may be composed of one or more levers connected to the aforesaid levers by links, or by chains or cables passing around gear pulleys, or even by gear wheels or the like.

One embodiment of this invention is shown by way of example, as well as diagrams of several modifications, in the accompanying drawings, in which:—

Figures 1 and 2 are an elevation and a plan of a chassis provided with a suspension device. Fig. 3 represents a modification of the rear suspension arm and of the corresponding lever. Fig. 4 illustrates a modification of the lever connecting device, and Fig. 5 shows a modification of the suspension device.

The outer ends of the suspension springs 1 and 2 are attached in the usual manner to the ends of the chassis 3, while their inner ends are attached to the arms 4 and 5 of the suspension levers 4, 6 and 5, 7 mounted on the girders of the chassis. To the arms 6 of the front levers are attached at 8 pulling members 9 arranged in proximity to the girders. The opposite ends 10 of such pulling members are attached to two levers 11, which are jointed at 12 to the arms 7 of the rear levers. Both the levers 11, quite independent of the chassis, are connected to one another for instance by means of a lever having two equal arms 13 which is jointed at its middle 14 to the chassis and the ends of which are connected by the pulling members 15 at points 16 similarly chosen on the levers 11, for instance at the middle between the points 10 and 12.

The operation is as follows: The jointed system constituted by the chassis, the springs resting on the axles, the suspension levers and their connecting mechanism being assumed to be in equilibrium, the passage of a wheel, for instance the right fore wheel, over an obstacle has the effect of producing a sudden compression of the respective spring 1 and hence an additional strain which swings in the direction of the arrow A the lever 4, 6 connected to such spring. There is, as a result, at the right side of the car, a pull on the link 9 and a corresponding swing of the compensating lever 11, which has the effect of displacing the point 12 of such lever backwardly and the point 16 forwardly; so the lever 5, 7, swings in the direction of the arrow B, while the link 15 is pulled and swings the scale-beam 13 in the direction of the arrow C (see Fig. 2). The scale-beam transmits such pull, on the left side of the car, in pulling, by the corresponding link 15, the compensation lever 11 backwardly; the points 10 and 12 of the latter are also moved backwardly, so that the left lever 5, 7 swings in the direction of arrow B, and that the left lever 4, 5, pulled by the link 9, swings in the inverse direction of the arrow A. The three suspension levers to which the additional strain is thus transmitted so swing as to increase the tension of the respective springs. The operation is the same regardless of that wheel which meets with the obstacle.

The proportions of the levers may be determined in such a manner that the additional strains exercised simultaneously on the four springs are equal, or that those exercised on the rear springs are at a given rate with regard to those exercised on the fore springs.

The desired distribution is not materially influenced either by the passive resistances or by the effects of inertia as the friction and the inertia of the levers and the links are negligible. However, it is influenced to a certain extent by the fact that the rates of the lever arms vary as the latter are inclined with regard to the direction of the strains transmitted to the same.

If desired, such cause of variation may be eliminated by giving to the ends of the suspension levers a suitably curved shape and by providing the ends of their connecting links 8 and 10 with yielding parts running on such curved levers, as shown at the front of the car in Fig. 1 and at the rear in Fig. 3.

Instead of connecting the compensation levers 11 to one another by a scale-beam and two rods 15, the same result may be obtained by means of pulleys 16 located at the angles of the chassis, over which will pass a cable or chain 17 or by means of elbowed levers or bell-cranks 18 also located at the angles of the chassis and connected to one another as well as with the levers 11 by chains or links 19. Fig. 4 shows at the same time both such means. Any other gearing combinations capable of being easily fitted in the rear part of the chassis are also applicable to connect the levers 11 in the desired manner. The arrangement of the suspension levers may also be inverted for instance as shown in Fig. 5 without changing either the operation or the results obtained.

Claims:

1. In a vehicle, the combination of a chassis, four flat springs underneath the said chassis, the outer ends of such springs being connected with the chassis, four bell-crank suspension levers having their elbows jointed to the chassis, two compensation levers located at the sides of the vehicle, two links, one end of each of the compensation levers being connected with an arm of one of the two respective suspension levers, and the opposite end of each of the said compensation levers being connected by one of the said links with an arm of one of the other two respective suspension levers, the other arms of the four suspension levers being connected with the inner ends of the respective flat springs, and means connected at the intermediate points of the two compensation levers and adapted to cause such points to move in inverse directions parallel to the longitudinal direction of the vehicle.

2. In a vehicle, the combination of a chassis, four flat springs underneath the said chassis, the outer ends of such springs being connected with the chassis, four bell-crank suspension levers having their elbows jointed to the chassis, two compensation levers located at the sides of the vehicle, two links, one end of each of the compensation levers being connected with an arm of one of the two respective suspension levers, and the opposite end of each of the said compensation levers being connected by one of the said links with an arm of one of the other two respective suspension levers, the other arms of the four suspension levers being connected with the inner ends of the respective flat springs, and a lever the middle of which is connected with the chassis and the ends of which are connected with intermediate points of the compensation levers.

3. In a vehicle, the combination of a chassis, four flat springs underneath the said chassis, the outer ends of such springs being connected with the chassis, four bell-crank suspension levers having their elbows jointed to the chassis, two compensation levers located at the sides of the vehicle, two links, one end of each of the compensation levers being connected with an arm of one of the two respective suspension levers, and the opposite end of each of the said compensation levers being connected by one of the said links with an arm of one of the other two respective suspension levers, the other arms of the four suspension levers being connected with the inner ends of the respective flat springs, and a lever the middle of which is connected with one end of the chassis, and two links connected at the one hand with the ends of the last named lever and on the other hand with intermediate points of the said compensation levers.

4. In a vehicle, the combination of a chassis, four flat springs underneath such chassis, the outer ends of such springs being attached to the chassis, four bell-crank suspension levers having their elbows jointed to the chassis, two compensation levers located at the opposite sides of the vehicle, two links, supple parts at the ends of such links, one end of each of the compensation levers being connected with an arm of one of the two respective suspension levers, and the opposite end of each of the said compensation levers being connected by one of the said links and the respective supple parts with an arm of one of the two other respective suspension levers, the said compensation levers and the said suspension lever arms having curved parts on which the said supple parts run and unroll, the others arms of the four suspension levers being connected with the inner ends of the respective flat springs, and means connected at intermediate points of the compensation levers and adapted to cause such points to move in inverse directions parallel to the longitudinal direction of the vehicle.

In testimony, that I claim the foregoing as my invention I have signed my name in presence of two subscribing witnesses.

CAMILLE CONTAL.

Witnesses:
CHAS. P. PRESSLY,
MAURICE ROUX.

Copies of this patent may be obtained for five cents each, by addressing the "Commissioner of Patents, Washington, D. C."